United States Patent
Kanto et al.

(10) Patent No.: US 12,160,113 B2
(45) Date of Patent: Dec. 3, 2024

(54) POWER TRANSMISSION DEVICE

(71) Applicant: TOYODA GOSEI CO., LTD., Kiyosu (JP)

(72) Inventors: Toru Kanto, Kiyosu (JP); Minoru Shibata, Kiyosu (JP); Shin-Ichiro Matsuzawa, Nagakute (JP); Toshiaki Watanabe, Nagakute (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 26 days.

(21) Appl. No.: 18/188,100

(22) Filed: Mar. 22, 2023

(65) Prior Publication Data

US 2023/0327485 A1    Oct. 12, 2023

(30) Foreign Application Priority Data

Mar. 25, 2022    (JP) .................................. 2022-050603

(51) Int. Cl.
*H02J 50/00* (2016.01)
*H02J 50/10* (2016.01)
*H02J 50/70* (2016.01)

(52) U.S. Cl.
CPC ............ *H02J 50/005* (2020.01); *H02J 50/10* (2016.02); *H02J 50/70* (2016.02)

(58) Field of Classification Search
CPC ........... H02J 50/005; H02J 50/10; H02J 50/70
See application file for complete search history.

(56) References Cited

U.S. PATENT DOCUMENTS

| | | | |
|---|---|---|---|
| 8,115,449 B2 | 2/2012 | Jung | |
| 9,565,794 B2 | 2/2017 | Kanno | |
| 9,947,462 B2 | 4/2018 | Kanno | |
| 10,410,786 B2 * | 9/2019 | Kamikihara | .......... H01F 27/363 |
| 2007/0064406 A1 * | 3/2007 | Beart | .................... H01F 27/363 |
| | | | 361/816 |
| 2009/0267558 A1 | 10/2009 | Jung | |
| 2014/0008995 A1 | 1/2014 | Kanno | |
| 2017/0110242 A1 | 4/2017 | Kanno | |

FOREIGN PATENT DOCUMENTS

| | | |
|---|---|---|
| JP | 2009-268334 A | 11/2009 |
| JP | 2011-205750 A | 10/2011 |
| JP | 2014-110726 A | 6/2014 |
| JP | 2016-103613 A | 6/2016 |
| JP | 2016-167753 A | 9/2016 |
| JP | 6124085 B2 | 5/2017 |

\* cited by examiner

*Primary Examiner* — Carlos Amaya
(74) *Attorney, Agent, or Firm* — Posz Law Group, PLC

(57) ABSTRACT

Provided is a power transmission device that has a simple structure and suppresses magnetic field leakage from a power transmission coil while suppressing excessive increase in the outer shape and the weight of the power transmission device. A power transmission device 1 includes: a power transmission portion 2 including a power transmission coil 20 and a housing 3 made of metal and having a peripheral wall 30 surrounding the power transmission portion 2. A shielding portion 5 protruding inward of the peripheral wall 30 is integrated with, of the peripheral wall 30, a top end 30*t* located on a power reception coil 90 placement side.

4 Claims, 3 Drawing Sheets

POWER TRANSMISSION DEVICE

TECHNICAL FIELD

The present invention relates to a power transmission device for wirelessly supplying power to an electronic device.

BACKGROUND ART

In recent years, a power transmission device for wirelessly supplying power by electromagnetic coupling to an electric vehicle, an electric bicycle, or an electronic device typified by a portable information terminal such as a smartphone or a tablet, has been proposed. As power transmission methods in this type of power transmission device, a non-radiative type and a radiative type are known. Of these, as non-radiative-type power transmission methods, there is a type using magnetic field coupling including electromagnetic induction and magnetic field resonance, or using electric field coupling. As radiative-type power transmission methods, there is a type using energy of an electromagnetic wave such as a microwave or a laser beam.

At present, the non-radiative type is generally used as a power transmission method of the power transmission device. In such a non-radiative-type power transmission device, generally, power supply from a power transmission coil side to a power reception coil side is performed using electromagnetic induction or magnetic field resonance between the power transmission coil and the power reception coil (see, for example, JP2009-268334(A), JP2016-103613(A), JP2014-110726(A), and JP2011-205750(A)).

JP2009-268334(A) discloses a non-radiative-type power transmission device that wirelessly supplies power from a power transmission coil (primary-side core) to a power reception coil (secondary-side core), to charge a battery cell electrically connected to the power reception coil. Also, JP2016-103613(A) and JP2014-110726(A) disclose non-radiative-type power transmission devices for supplying power to an electric vehicle. JP2011-205750(A) discloses a non-radiative-type power transmission device using electromagnetic resonance between a power transmission coil and a power reception coil.

SUMMARY OF INVENTION

Technical Problem

In transmitting power to an electronic device by each type of power transmission device using electromagnetic induction or magnetic field resonance as described above, there is a case where magnetic field leakage occurs from a gap between a power transmission coil and a power reception coil. The magnetic field leakage causes reduction in power transmission efficiency between the power transmission coil and the power reception coil, and further, a leakage magnetic flux adversely affects another electronic device or the like.

In order to suppress the above magnetic field leakage, for example, JP2009-268334(A) discloses a configuration for blocking a magnetic field generated at primary-side and secondary-side cores by a shielding plate. JP2016-103613(A) discloses a configuration for suppressing magnetic field leakage by a shield member provided on the upper side of a power reception coil. JP2014-110726(A) discloses a configuration for canceling a leakage magnetic flux from a power transmission coil by a canceling coil.

The mechanism for suppressing magnetic field leakage in the above configurations has a complicated structure or is large in outer shape and weight. This results in such problems that the manufacturing cost of the power transmission device including the above mechanism increases and the outer shape and the weight of the power transmission device become excessively large.

The present invention has been made in view of the above circumstances, and an object of the present invention is to provide a power transmission device that has a simple structure and suppresses magnetic field leakage from a power transmission coil while suppressing excessive increase in the outer shape and the weight of the power transmission device.

Solution to Problem

In order to achieve the above object, a power transmission device of the present invention includes: a power transmission portion including a power transmission coil; and a housing having a peripheral wall made of metal, the peripheral wall surrounding the power transmission portion. A shielding portion made of metal and protruding inward of the peripheral wall is integrated with, of the peripheral wall, a top end located on a power reception coil placement side.

The power transmission device of the present invention has a simple structure and suppresses magnetic field leakage from the power transmission coil while suppressing excessive increase in the outer shape and the weight of the power transmission device.

DESCRIPTION OF EMBODIMENTS

Figure 1:
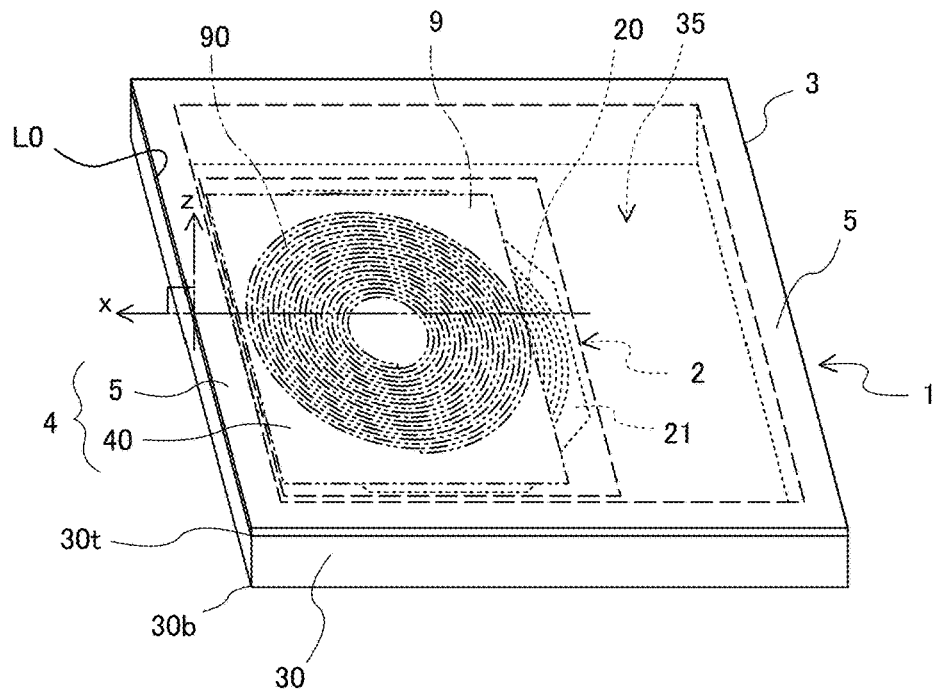
FIG. 1 schematically illustrates the relationship between a power transmission device of embodiment 1 and a power reception coil.

Hereinafter, embodiments of the present invention will be described. Unless otherwise specified, a numerical value range "a to b" described herein includes, in the range, a lower limit "a" and an upper limit "b". A numerical value range may be formed by arbitrarily combining such upper limit values, lower limit values, and numerical values described in embodiments and the like. Further, numerical values arbitrarily selected within a numerical value range may be used as upper limit and lower limit numerical values.

A power transmission device of the present invention includes a power transmission portion and a housing. The power transmission portion includes a power transmission coil, and a peripheral wall made of metal is provided so as to surround the power transmission portion. The power transmission device has a side where an electronic device is placed, i.e., a side where a power reception coil is placed (referred to as power reception coil placement side in the specification). A shielding portion protruding inward of the peripheral wall is integrated with, of the peripheral wall, a top end located on the power reception coil placement side.

Here, when power is transmitted from the power transmission coil of the power transmission device toward the power reception coil of the electronic device, a part of a magnetic flux formed by the power transmission coil becomes a so-called leakage magnetic flux which does not interlink with the power reception coil. A part of the leakage magnetic flux extends inward of the housing, and another part of the leakage magnetic flux passes by the top end of the peripheral wall to extend outward of the housing.

In the power transmission device of the present invention, the shielding portion protruding inward of the peripheral wall is integrated with the top end of the peripheral wall. Therefore, in the power transmission device of the present invention, at least a part of the leakage magnetic flux passing by the top end of the peripheral wall to extend outward of the housing is blocked by the shielding portion, thus inhibiting a magnetic field from spreading to the side that is radially outward of the power transmission coil and outward of the housing. That is, the power transmission device of the present invention suppresses magnetic field leakage from the power transmission coil. In addition, in the power transmission device of the present invention, the shielding portion is merely formed by being integrated with the top end of the peripheral wall and protruding inward of the peripheral wall, and thus has a very simple structure. Therefore, the power transmission device of the present invention also has a simple structure, so that the outer shape and the weight thereof do not excessively increase. Accordingly, the power transmission device of the present invention is considered to be a power transmission device that has a simple structure and suppresses magnetic field leakage from the power transmission coil while suppressing excessive increase in the outer shape and the weight of the power transmission device.

Hereinafter, the power transmission device of the present invention will be specifically described.

The power transmission device of the present invention includes the power transmission portion and the housing. Of these, the power transmission portion necessarily includes the power transmission coil, and may include a sub member of a general power transmission device together with the power transmission coil.

The power transmission coil may be any type that enables power to be supplied to a power reception coil provided to an electronic device that is a power transmission target, in a non-radiative manner, through electromagnetic induction or magnetic field resonance. The power transmission coil may be referred to as a primary coil, and the power reception coil may be referred to as a secondary coil.

Sub members that may compose the power transmission portion together with the power transmission coil may include various kinds such as a lead wire connected to the power transmission coil. In the power transmission device of the present invention, the power transmission portion particularly preferably includes, as the sub member, a magnetic member for blocking a magnetic flux extending from the power transmission coil toward a side opposite to the power reception coil or a magnetic field spreading toward the opposite side.

Such a magnetic member included in the power transmission portion may be a member including a general magnetic material such as ferrite, Sendust, or carbonyl Iron, for example. Although the magnetic member may be made of such a magnetic material, a member obtained by kneading a magnetic material into a base material such as silicon or rubber is preferably used in view of cost and ease of handling.

The magnetic member preferably forms, of the power transmission portion, a surface located on a power reception coil non-placement side, i.e., a bottom surface of the power transmission portion. The shape of the magnetic member is not particularly limited, but preferably has a thin shape such as a sheet shape, a film shape, or a tape shape, so as to have a reduced weight and widely cover, of the power transmission coil, the surface on the power reception coil non-placement side, i.e., the bottom surface of the power transmission coil.

The magnetic member is particularly preferably integrated with the bottom surface of the power transmission coil by means such as adhesion, in view of ease of handling of the power transmission portion at the time of manufacturing of the power transmission device, or the like.

As described above, the housing includes the peripheral wall made of metal and the shielding portion made of metal. Metals that are the materials of the peripheral wall and the shielding portion may be the same or different from each other. Metal forming a part of the peripheral wall or the shielding portion may be different from metal forming another part. Metal forming the peripheral wall or the shielding portion may be a simple substance of each kind of metal or may be an alloy thereof. As metal forming the peripheral wall or the shielding portion, a material used for a general magnetic shield may be selected.

The peripheral wall surrounds the power transmission coil described above, and has an end on the power transmission coil side and an end on the power reception coil side. Of the peripheral wall, the end on the power transmission coil side is referred to as a bottom end of the peripheral wall. Of the peripheral wall, the end on the power reception coil side is the top end described above.

The peripheral wall has a substantially tubular shape so as to surround the power transmission coil as described above, and may have a cylindrical shape or a polygonal tube shape or may have another shape. Also, the positional relationship between the power transmission coil and the peripheral wall is not particularly limited, and the power transmission coil may be placed at the center of the peripheral wall or may be placed so as to be shifted toward an end side of the peripheral wall.

The height of the peripheral wall, i.e., the length in the top end-bottom end direction of the peripheral wall, may be set as appropriate in accordance with the size of the power transmission coil, the positional relationship between the power transmission coil and the power reception coil, or the like, and is not particularly limited. Also, the thickness of the peripheral wall, i.e., the length in the inner-outer direction of the peripheral wall, is not particularly limited.

The shielding portion is integrated with the top end of the peripheral wall, and is particularly preferably formed over the entire perimeter of the peripheral wall. However, the shielding portion may be formed only at a part in the perimeter direction of the peripheral wall. Also in a case where the shielding portion is formed only at a part in the perimeter direction of the peripheral wall, magnetic field leakage from the power transmission coil is suppressed at the above part.

In a case where the peripheral wall has a polygonal tube shape, the shielding portion is particularly preferably provided over two or more sides of the peripheral wall. In this case, the power transmission coil is preferably placed so as to be shifted toward the sides where the shielding portion is provided, rather than at the center of the peripheral wall. Thus, the shielding portion becomes closer to the power transmission coil, so that magnetic field leakage from the power transmission coil described above is more reduced.

The shielding portion is formed so as to protrude from the top end of the peripheral wall inward of the peripheral wall, in other words, radially inward of the peripheral wall, and the shape of the shielding portion is not particularly limited. For example, the shielding portion may have a flat-plate shape, a curved-plate shape, or a shape other than a plate shape, e.g., a columnar shape or a visor shape. In a case where the shielding portion protrudes to a position close to the power transmission coil surrounded by the peripheral wall, there is an advantage that magnetic field leakage from the power transmission coil is more suppressed.

A preferable range of a protrusion length Le of the shielding portion will be described in detail, in an embodiment section.

The housing may have a substantially tubular shape formed by the peripheral wall surrounding the power transmission coil described above and the shielding portion integrated with the peripheral wall, or may have, in addition thereto, at least one of a bottom lid covering the bottom end of the peripheral wall and a top lid covering the top end of the peripheral wall, thus forming a box shape. In order to isolate the power transmission coil stored inside the housing from the outside environment, the housing preferably has either the bottom lid or the top lid, and more preferably has both of the bottom lid and the top lid. The materials of the bottom lid and the top lid may or may not be metal. However, in order to suppress magnetic field leakage from the power transmission coil, preferably, at least parts of the bottom lid and the top lid are made of metal.

The bottom lid or the top lid described above may be a mere metal plate, but is preferably a board provided with a metal pattern having a predetermined function. The metal pattern may be a circuit pattern for the power transmission device, but preferably includes a metal pattern for magnetic field leakage suppression.

Here, at the power transmission coil, electromagnetic waves having a frequency outside a frequency range (e.g., 100 kHz to 200 kHz) used for electromagnetic induction or the like with the power reception coil are generated. The electromagnetic waves outside the above frequency range interfere with electromagnetic induction or magnetic field resonance between the power transmission coil and the power reception coil, thus hampering efficient power transmission.

Therefore, in particular, the top lid located between the power transmission coil and the power reception coil of the electronic device is preferably provided with a magnetic-field-leakage suppression metal pattern having a filter effect against the electromagnetic waves outside the above frequency range generated at the power transmission coil so as to suppress leakage of the electromagnetic waves to the power reception coil side.

Among the electromagnetic waves outside the above frequency range, a frequency range not less than 200 kHz is used for GPS, digital audio, FM radio, etc. Therefore, the magnetic-field-leakage suppression metal pattern particularly preferably has a filter effect for suppressing leakage of electromagnetic waves in a frequency range not less than 200 kHz.

As the magnetic-field-leakage suppression metal pattern, a known pattern may be used, but a comb-shaped pattern described in an embodiment below is preferably used.

In a case of providing the above magnetic-field-leakage suppression metal pattern to the top lid, the shielding portion formed from a metal pattern is preferably provided in, of the top lid, an area on the radially outer side of the magnetic-field-leakage suppression metal pattern. In this case, by attaching the top lid to the peripheral wall, the shielding portion is brought into contact with the peripheral wall, and thus there is an advantage that the housing having the shielding portion is manufactured easily and at low cost. The magnetic-field-leakage suppression metal pattern and the shielding portion are arranged with a distance therebetween, and both may be close to each other or far from each other.

Also in a case of not providing the above magnetic-field-leakage suppression metal pattern to the top lid, providing the shielding portion formed from a metal pattern in a radially outer area of the top lid similarly has an advantage that the housing having the shielding portion is manufactured easily and at low cost.

Hereinafter, the power transmission device of the present invention will be described using specific examples.

Embodiment 1

Figure 2:
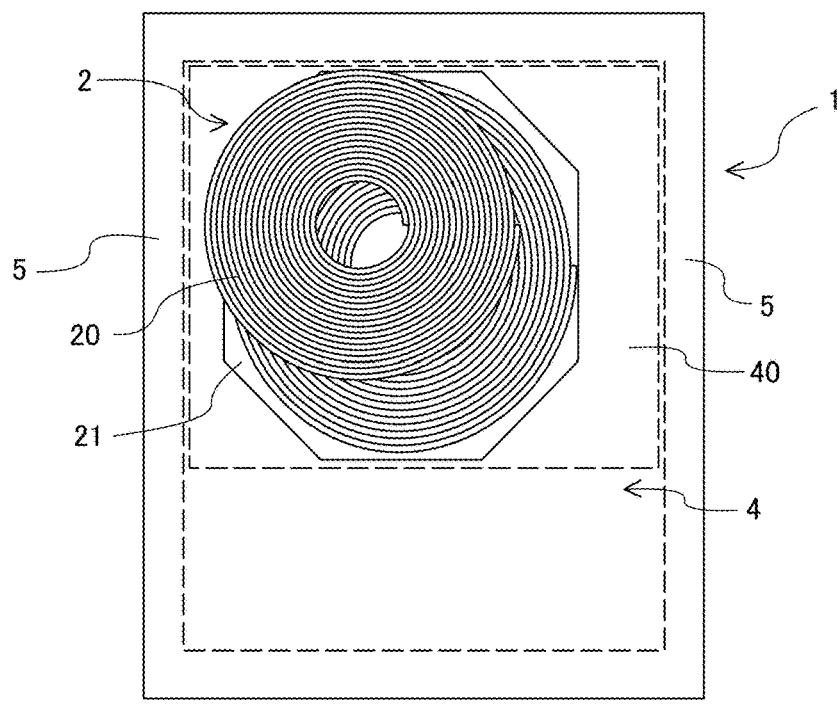
FIG. 2 schematically illustrates the power transmission device of embodiment 1 as seen from a top-end side of a peripheral wall.
Figure 3:
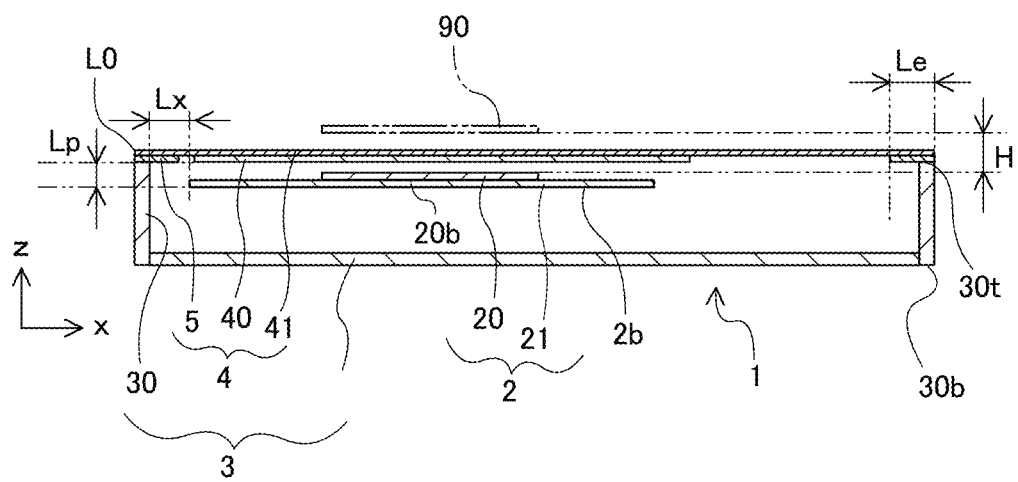
FIG. 3 schematically illustrates a cross-section of the power transmission device of embodiment 1 along a thickness direction.
Figure 4:
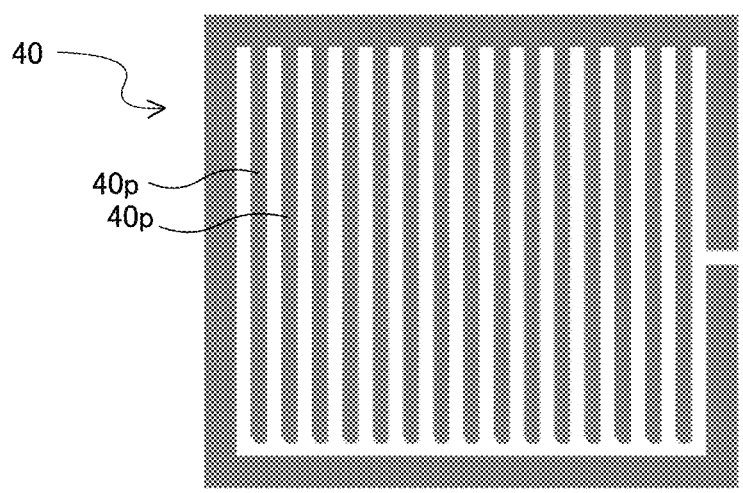
FIG. 4 schematically illustrates a magnetic-field-leakage suppression metal pattern in the power transmission device of embodiment 1.
Figure 5:
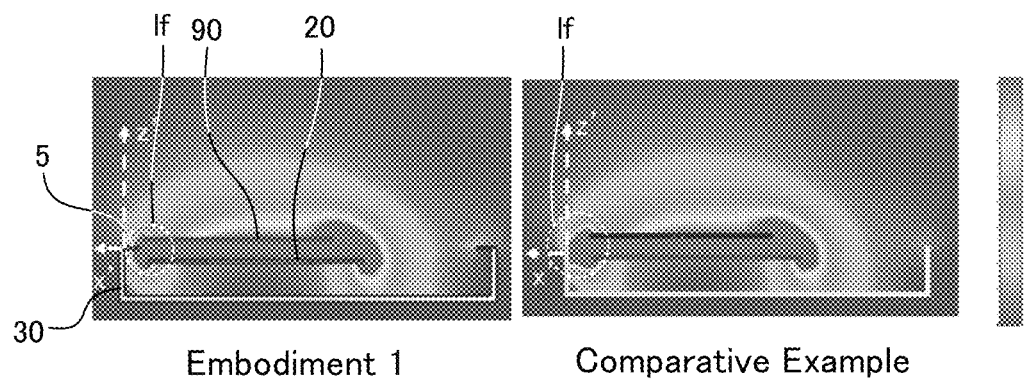
FIG. 5 schematically illustrates a result of evaluation 1.
Figure 6:
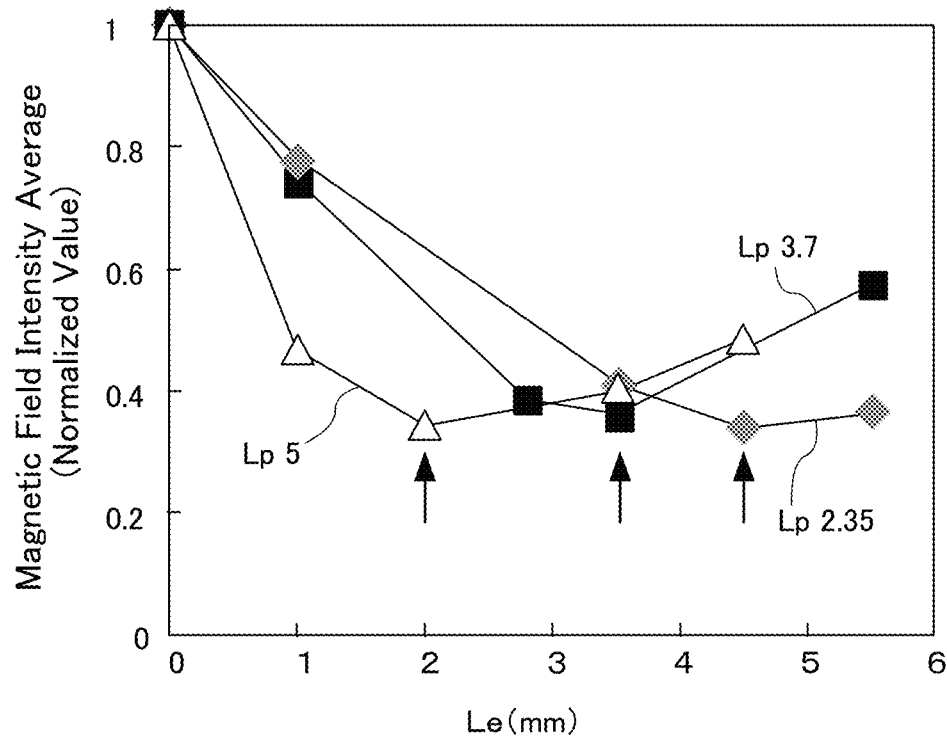
FIG. 6 schematically illustrates a result of evaluation 2.

A power transmission device of embodiment 1 is attached in a vehicle compartment, and is for charging a portable information terminal. FIG. 1 schematically illustrates the relationship between the power transmission device of embodiment 1 and a power reception coil. FIG. 2 schematically illustrates the power transmission device of embodiment 1 as seen from a top-end side of a peripheral wall. FIG. 3 schematically illustrates a cross-section of the power transmission device of embodiment 1 along a thickness direction. FIG. 4 schematically illustrates a magnetic-field-leakage suppression metal pattern in the power transmission device of embodiment 1. FIG. 5 schematically illustrates a result of evaluation 1. FIG. 6 schematically illustrates a result of evaluation 2.

As shown in FIGS. 1 to 3, a power transmission device 1 of embodiment 1 includes a power transmission portion 2 and a housing 3.

Of these, the power transmission portion 2 includes a power transmission coil 20, a magnetic member 21, and a lead wire (not shown). The lead wire is attached to the power transmission coil 20, and is connected to a power source (not shown).

The magnetic member 21 is formed by kneading ferrite powder into silicon rubber, and has a sheet shape. As shown in FIGS. 1 and 3, the magnetic member 21 is adhered to a bottom surface 20*b* of the power transmission coil 20, and covers the power transmission coil 20 from the bottom surface 20*b* side.

The housing 3 has a peripheral wall 30, a bottom lid 35, and a top lid 4.

Of these, the peripheral wall 30 is made of aluminum and has a polygonal tube shape, and the axis thereof is directed in a power transmission coil 20-power reception coil 90 direction, i.e., z direction in FIGS. 1 and 3. In other words, the top-end side and the bottom-end side of the peripheral wall 30 are opened.

The power reception coil 90 is included in an electronic device 9, and is placed at the top lid 4 of the power transmission device 1, so as to receive power transmitted from the power transmission coil 20.

The bottom lid 35 made of aluminum and having a plate shape is integrated with a bottom end 30*b* of the peripheral wall 30. By the bottom lid 35, the peripheral wall 30 is closed between inside and outside, on the bottom end 30b side of the peripheral wall 30.

The power transmission portion 2 is fixed to the peripheral wall 30, on a side slightly closer to a top end 30t than to the bottom lid 35. The power transmission portion 2 is placed with the power transmission coil 20 facing the top side and the magnetic member 21 facing the bottom side.

The top lid 4 having a plate shape is integrated with the top end 30t of the peripheral wall 30. The top lid 4 is a printed board having two kinds of metal patterns formed on a board 41.

One of the metal patterns formed at the top lid 4 is a metal pattern 40 for magnetic-field-leakage suppression, and is formed in a radially inner area of the top lid 4. The other of the metal patterns formed at the top lid 4 is a shielding portion 5, and is formed in a radially outer area of the top lid 4. The magnetic-field-leakage suppression metal pattern 40 is made of a conductive metal material, and is connected to a lead wire (not shown) so as to be supplied with power from a power source (not shown) via the lead wire. Meanwhile, the shielding portion 5 is made of aluminum as with the peripheral wall 30, and is not connected to any power source.

As shown in FIG. 4, the magnetic-field-leakage suppression metal pattern 40 is formed such that straight patterns 40p arranged with intervals therebetween are connected in a comb shape. The width of each straight pattern 40p and the interval between the adjacent patterns 40p are both about 5 mil (about 0.125 mm).

As shown in FIGS. 1 and 2, the top lid 4 has a substantially rectangular shape, and the shielding portion 5 formed in the radially outer area of the top lid 4 also has a substantially rectangular ring shape. The width of the shielding portion 5, i.e., the length of the shielding portion 5 in the radially inner-outer direction of the top lid 4, is 3.5 mm.

As shown in FIG. 3, the top lid 4 is integrated with the top end 30t of the peripheral wall 30 while the shielding portion 5 and the magnetic-field-leakage suppression metal pattern 40 face the bottom side. Of these, the shielding portion 5 is opposed to the peripheral wall 30. The top lid 4 is fastened to the top end 30t of the peripheral wall 30 by screws (not shown), whereby the shielding portion 5 is integrated with the top end 30t of the peripheral wall 30. The width of the shielding portion 5 is greater than the thickness of the peripheral wall 30, and the shielding portion 5 protrudes inward of the peripheral wall 30 as shown in FIG. 3. The width of the shielding portion 5 is considered to be a protrusion length Le (see FIG. 3) of the shielding portion 5.

As shown in FIG. 3, the top end 30t of the peripheral wall 30 extends further toward the power reception coil 90 placement side, relative to the power transmission coil 20, and therefore the shielding portion 5 is considered to be placed further on the top-end side of the peripheral wall 30 relative to the power transmission coil 20.

In the power transmission device 1 of embodiment 1, the thickness of the shielding portion 5 is 0.5 mm, the thickness of the peripheral wall 30 is 1.5 mm, and a distance H between the power transmission coil 20 and the power reception coil 90 is 5.0 mm. A length Lp from a bottom surface 2b of the power transmission portion 2 to the top end 30t of the peripheral wall 30 is 3.7 mm, the protrusion length Le of the shielding portion 5 is 3.5 mm, and a shortest distance Lx between the peripheral wall 30 and an outer peripheral end of the power transmission coil 20 or the magnetic member 21 is 0.7 mm.

Therefore, the relationship of Lx, Lp, and Le satisfies Lx<(Lp+Le).

Here, in order to more efficiently suppress magnetic field leakage from the power transmission coil 20, setting the relationship of Lx, Lp, and Le so as to satisfy Lx<(Lp+Le) is considered preferable. This is for efficiently blocking magnetic field leakage occurring at the power transmission coil 20 by the peripheral wall 30 and the shielding portion 5.

As described above, in the power transmission device 1 of embodiment 1, the relationship of Lx, Lp, and Le satisfies Lx<(Lp+Le). Thus, the power transmission device 1 of embodiment 1 is considered to efficiently block magnetic field leakage from the power transmission coil 20.

[Evaluation 1]

As a comparative example, a power transmission device 1 that was substantially the same as the power transmission device 1 of embodiment 1 except that the shielding portion 5 was not provided, was prepared.

For the power transmission device 1 of embodiment 1 and the power transmission device 1 of the comparative example, magnetic fields occurring at the time of power transmission were evaluated through simulation. The result thereof is shown in FIG. 5.

As shown in FIG. 5, in each of the power transmission devices 1 of embodiment 1 and the comparative example, a magnetic field is generated between the power transmission coil 20 and the power reception coil 90, and a part of the magnetic field leaks to the outer side, i.e., the peripheral wall 30 side, from between the power transmission coil 20 and the power reception coil 90.

However, regarding a magnetic field 1f generated in each power transmission device 1 and leaking to the peripheral wall 30 side, particularly in the power transmission device 1 of embodiment 1, the magnetic field 1f is more reduced on the forward side in the x direction, i.e., on the peripheral wall 30 side opposed to the power transmission coil 20, than in the power transmission device 1 of the comparative example. The reason is inferred such that the magnetic field 1f was blocked by the shielding portion 5 provided at the top end 30t of the peripheral wall 30. This result shows that the power transmission device 1 of the present invention in which the shielding portion 5 is provided at the top end 30t of the peripheral wall 30 suppresses magnetic field leakage.

[Evaluation 2]

Reference power transmission devices 1 for evaluation were prepared in three types in which the length Lp from the bottom surface 2b of the power transmission portion 2 to the top end 30t of the peripheral wall 30 was 2.35 mm (Lp 2.35), 3.7 mm (Lp 3.7), and 5 mm (Lp 5). These reference power transmission devices 1 are substantially the same as the power transmission device 1 of embodiment 1 except for the values of Lp and Le.

For each reference power transmission device 1, the average of the intensity of the magnetic field formed in a case where the protrusion length Le of the shielding portion 5 was changed variously was calculated through simulation. The result thereof is shown in FIG. 6.

The above "average of the intensity of the magnetic field" was calculated as follows: for each reference power transmission device 1 (Lp 2.35, Lp 3.7, Lp 5), the magnetic field intensity on the outermost side (indicated by L0 in FIG. 3) of the top end 30t of the peripheral wall 30 was acquired over the entire length of one side of the peripheral wall 30, and then the average value thereof was calculated. On the vertical axis in FIG. 6, the average value of the magnetic field intensity in each reference power transmission device 1 is represented by a ratio for which a case where the protrusion length Le of the shielding portion 5 is 0 mm is defined as 1. The same applies in evaluation 3 described later.

As shown in FIG. 6, the magnetic field intensity in each power transmission device 1 changes with respect to the protrusion length Le of the shielding portion 5. More specifically, until the protrusion length Le of the shielding portion 5 reaches a predetermined length, the magnetic field intensity decreases with increase in Le. The value of Le that minimizes the magnetic field intensity, i.e., the value of Le that most reduces magnetic field leakage, differs in accordance with the length Lp from the bottom surface 2b of the power transmission portion 2 to the top end 30t of the peripheral wall 30, i.e., the height of the peripheral wall 30 present between the power transmission portion 2 and the power reception coil 90. If Lp increases, the protrusion length Le of the shielding portion 5 necessary for minimizing the magnetic field intensity is reduced. Although not present as an item in this evaluation 2, naturally, Lp and Le are mainly relevant to the shortest distance Lx between the peripheral wall 30 and the outer peripheral end of the power transmission coil 20 or the magnetic member 21. That is, if Lx is great, i.e., the peripheral wall 30 is far from the power transmission portion 2, the height Lp of the peripheral wall 30 and/or the protrusion length Le of the shielding portion 5 needs to be increased in order to suppress magnetic field leakage from the power transmission portion 2.

From these results, validity of the above relational expression Lx<(Lp+Le) is confirmed.

For reference, when the protrusion length Le of the shielding portion 5 exceeds the predetermined length, the magnetic field intensity increases again. The reason is inferred such that the magnetic field blocked by the shielding portion 5 comes into a turbulent state. However, actually, owing to the presence of the shielding portion 5, the turbulent magnetic field is inferred to stay on the inner side of the shielding portion 5.

Here, as shown in FIG. 6, at the point (indicated by an arrow in FIG. 6) where the magnetic field intensity is minimized in each power transmission device 1, the sum of Lp and Le is close to 7. From this finding, the inventor of the present invention has inferred that the relationship of the dimensions of the respective parts in each power transmission device 1 influences the effect of suppressing the magnetic field leakage.

[Evaluation 3]

Reference power transmission devices 1 for evaluation were prepared so as to have various different values about the following dimensions: the length Lp from the bottom surface 2b of the power transmission portion 2 to the top end 30t of the peripheral wall 30, the shortest distance Lx between the peripheral wall 30 and the outer peripheral end of the power transmission coil 20 or the magnetic member 21, and the distance H between the power transmission coil 20 and the power reception coil 90. Then, for each reference power transmission device 1, the average of the intensity of the magnetic field formed in a case where the protrusion length Le of the shielding portion 5 was changed variously was calculated through simulation, and the protrusion length Le of the shielding portion 5 at the point where the magnetic field intensity was minimized was obtained. Then, the relationship of the value of Le and the dimensions of the respective parts described above was evaluated. The result thereof is shown in Table 1.

TABLE 1

| | Part dimensions (mm) | | | | |
| --- | --- | --- | --- | --- | --- |
| | Lp | Lx | H | Le | (Lp + Le − Lx)/H |
| #1 | 2.35 | 4.7 | 5 | 4.5 | 0.43 |
| #2 | 3.7 | 4.7 | 5 | 3.5 | 0.5 |
| #3 | 5 | 4.7 | 5 | 2 | 0.46 |
| #4 | 3.7 | 4.7 | 3.5 | 2.8 | 0.51 |
| #5 | 3.7 | 7.2 | 5 | 5.5 | 0.4 |
| #6 | 3.7 | 9.7 | 5 | 8.5 | 0.5 |
| #7 | 2.4 | 7.2 | 5 | 7 | 0.44 |

As shown in Table 1, in any case, a relationship (Lp+Le−Lx)/H of the dimensions of the respective parts and Le at the point where the magnetic field intensity is minimized is kept within a predetermined range. More specifically, the value of (Lp+Le−Lx)/H is in a range of 0.35 to 0.55, and more preferably, in a range of 0.4 to 0.51. From this result, in order to minimize the magnetic field intensity, the relationship of the dimensions of the respective parts is considered to be preferably in a range of 0.35≤(Lp+Le−Lx)/H≤0.55 and more preferably in a range of 0.4≤(Lp+Le−Lx)/H≤0.51.

The present invention is not limited to only the embodiment described above and shown in the drawings, but may be modified as appropriate without deviating from the scope of the present invention. In addition, the components shown in the specification including the embodiment may be optionally taken out and combined with each other to carry out the present invention.

The invention claimed is:

1. A power transmission device comprising:
   a power transmission portion including a power transmission coil; and
   a housing having a peripheral wall made of metal, the peripheral wall surrounding the power transmission portion,
   wherein
   a shielding portion made of metal and protruding inward of the peripheral wall is integrated with, of the peripheral wall, a top end located on a power reception coil placement side, and
   the shielding portion is placed further on the top end of the peripheral wall relative to the power transmission coil.

2. The power transmission device according to claim 1, wherein
   the power transmission portion further includes a magnetic member overlaid at the power transmission coil, and
   a relationship of a length Lp from, of the power transmission portion, a bottom surface located on a power reception coil non-placement side to the top end of the peripheral wall, a protrusion length Le of the shielding portion, and a shortest distance Lx between the peripheral wall and an outer peripheral end of the power transmission coil or the magnetic member, satisfies Lx<(Lp+Le).

3. The power transmission device according to claim 2, wherein
   a relationship of the length Lp, the protrusion length Le, the shortest distance Lx, and a distance H between the power transmission coil and the power reception coil is in a range of 0.4≤(Lp+Le−Lx)/H≤0.51.

4. The power transmission device according to claim 1, wherein a lid is provided so as to be integrated with the top end of the peripheral wall and cover the power transmission portion from a top side,
the shielding portion is provided in a radially outer area of the lid, and
a magnetic-field-leakage suppression metal pattern is provided in a radially inner area of the lid.

* * * * *